(12) United States Patent
Manenti et al.

(10) Patent No.: US 12,319,577 B2
(45) Date of Patent: Jun. 3, 2025

(54) FURNACES AND PROCESSES FOR SYNTHESIS GAS PRODUCTION

(71) Applicants: POLITECNICO DI MILANO, Milan (IT); I.T.T. S.p.A., Milan (IT)

(72) Inventors: Flavio Manenti, Milan (IT); Giulia Piccioni, Milan (IT)

(73) Assignees: POLITECNICO DI MILANO, Milan (IT); I.T.T. S.p.A., Milan (IT)

( * ) Notice: Subject to any disclaimer, the term of this patent is extended or adjusted under 35 U.S.C. 154(b) by 813 days.

(21) Appl. No.: 17/611,937

(22) PCT Filed: May 15, 2020

(86) PCT No.: PCT/IB2020/054606
§ 371 (c)(1),
(2) Date: Nov. 17, 2021

(87) PCT Pub. No.: WO2020/234709
PCT Pub. Date: Nov. 26, 2020

(65) Prior Publication Data
US 2022/0380212 A1 Dec. 1, 2022

(30) Foreign Application Priority Data
May 17, 2019 (IT) .......................... 102019000006957

(51) Int. Cl.
*C01B 3/40* (2006.01)
*B01J 8/00* (2006.01)
(Continued)

(52) U.S. Cl.
CPC .............. *C01B 3/40* (2013.01); *B01J 8/0005* (2013.01); *B01J 8/062* (2013.01); *C01B 3/508* (2013.01);
(Continued)

(58) Field of Classification Search
None
See application file for complete search history.

(56) References Cited

U.S. PATENT DOCUMENTS 3,962,409 A 6/1976 Kotera et al.
4,336,063 A 6/1982 Guzmán-Bofill et al.
(Continued)

FOREIGN PATENT DOCUMENTS

EP 1411029 A1 4/2004
WO 2015015457 A1 2/2015

OTHER PUBLICATIONS

International Search Report and Written Opinion in corresponding International Application No. PCT/IB2020/054606 mailed on Aug. 17, 2020, 12 pages.

*Primary Examiner* — Joseph D Anthony
(74) *Attorney, Agent, or Firm* — MH2 Technology Law Group LLP (57) ABSTRACT

A furnace for gas fields, refineries reforming, petrochemical plants, or hydrogen generation by gasification may include: a radiant zone; a convective zone; and a first and second series of pipes through which at least two segregated process gas flows respectively pass. A first process gas flow may enter the furnace through the convective zone and, flowing through the first series of pipes, may leave the furnace through the radiant zone, or alternatively the first process gas flow may enter the furnace through the radiant zone and, flowing through the first series of pipes, may leave the furnace through the radiant zone. At least a second process gas flow may enter the furnace through the convective zone, may pass through the second series of pipes, and may leave the furnace through the convective zone. The second of series of pipes may be made of material resistant to acid gases.

19 Claims, 8 Drawing Sheets

(51) Int. Cl.
*B01J 8/06* (2006.01)
*C01B 3/50* (2006.01)
*C01B 32/40* (2017.01)

(52) U.S. Cl.
CPC ..... *C01B 32/40* (2017.08); *B01J 2208/00504* (2013.01); *B01J 2208/00539* (2013.01); *B01J 2208/065* (2013.01); *B01J 2219/00918* (2013.01); *C01B 2203/0233* (2013.01); *C01B 2203/0475* (2013.01); *C01B 2203/0485* (2013.01); *C01B 2203/1041* (2013.01); *C01B 2203/1241* (2013.01); *C01B 2203/1614* (2013.01); *C01B 2203/1628* (2013.01); *C01B 2210/0051* (2013.01); *C01B 2210/0064* (2013.01)

(56) References Cited

U.S. PATENT DOCUMENTS

| | | | |
|---|---|---|---|
| 2004/0141910 A1* | 7/2004 | Vizoso | B01J 19/2475 502/220 |
| 2016/0185596 A1* | 6/2016 | Manenti | C01B 17/508 252/373 |
| 2022/0380212 A1* | 12/2022 | Manenti | C01B 3/40 |

* cited by examiner

FURNACES AND PROCESSES FOR SYNTHESIS GAS PRODUCTION

CROSS-REFERENCE TO RELATED APPLICATION(S)

This application is a national stage entry from International Application No. PCT/IB2020/054606, filed on May 15, 2020, in the Receiving Office ("RO/IB") of the International Bureau of the World Intellectual Property Organization ("WIPO"), and published as International Publication No. WO 2020/234709 A1 on Nov. 26, 2020. International Application No. PCT/IB2020/054606 claims priority from Italian Patent Application No. 102019000006957, filed on May 17, 2019, in the Italian Patent and Trademark Office ("IPTO"). The entire contents of all of the above application(s) and related publication(s) are incorporated herein by reference.

DESCRIPTION

Field of the Invention

The present invention relates to a furnace for gas fields, refineries reforming, hydrogen production by gasification, and the petrochemical industry.

BACKGROUND

As known any use of fossil fuel source (crude, natural gas, shale gas and oil, coal) and non-fossil fuel source (biomass, biogas, geothermal) leads to the joint production of $CO_2$ and $H_2S$ in different proportions.

Gases containing such substances in discrete amounts are defined acid gases or tail gases and are being the object of a relevant scientific discussion due to their dramatic impact in terms of global warming and climate change, which they are the main responsible for.

To date acid gases are not being reused, if not only in very small amounts, and the only alternative to releasing them into the atmosphere is to seize and store them in deep waters or remote underground sites. Such extreme measures are in any case being debated as for the possible implementation and efficiency thereof.

In WO2015015457A1 to the Applicant it is disclosed using the aforesaid acid gases for producing synthesis gases ($CO$ and $H_2$, or syngas).

The syngas production takes place according to the following endothermic reaction:

The necessary energy supply is provided by the exothermic reaction:

This process, which in any case is obviously versatile as it can be associated to other productions with few modifications to already existing plants, however requires a considerable amount of activation energy. In fact, the rather high operating temperatures are higher than 800° C. and in some cases they overcome 1300° C. Furthermore, oxygen to be used in the second exothermic reaction must be carefully dosed to avoid excessive $SO_2$ oxidation, which represents a harmful emission, that must be removed for example by means of Claus plants or sulphuric acid production plants.

It is thus perceived the need to find alternative solutions in order to reduce the emission of such gases and possible polluting emissions.

U.S. Pat. No. 4,336,063 discloses an apparatus for the gas reduction of iron minerals provided with a reactor intended for such object and a reforming unit. The latter comprises a radiant chamber containing a tube bundle and two convective chambers, among which the second more distant from the radiant zone is also provided with a tube bundle. The concerned apparatus further comprises a series of ducts putting in fluid communication the reforming unit and the reactor.

In particular the two convective chambers are spaced apart from each other and in particular the latter is decidedly arranged far from the radiant zone.

Thus even if it is possible to distinguish more flows entering and leaving the steam reformer of which in particular:

A natural gas flow passes through the first convective chamber and enters the tube bundle of the radiant zone where the reforming reaction takes place, while gases produced leave the radiant zone;

And a second flow resulting from the mixture of the gas leaving the radiant zone enters the second convective chamber and leaves therefrom to be taken towards the reactor; the second flow entering and leaving the second convective chamber is in any case very distant and separated from the first convective chamber arranged near the radiant zone.

SUMMARY OF THE INVENTION

In order to overcome the aforesaid problems of the state of the art and in particular of WO2015015457A1 a furnace has been conceived wherein, in addition to industrial processes for obtaining intermediate products intended for the synthesis of high added value products, disposal reactions of such harmful emissions can be carried out in particular of acid gases such as $CO_2$ and $H_2S$, in particular $H_2S$.

The object of the present invention is a furnace comprising:
a radiant zone,
a convective zone,
a first and at least a second series of pipes through which at least two segregated process gas flows respectively pass, wherein:
the first process flow enters said furnace through the convective zone and, flowing through said first series of pipes, leaves said furnace through the radiant zone, or in alternative said first process flow enters said furnace of the radiant zone and, flowing through the first series of pipes, leaves said furnace through the radiant zone;
the second process flow, intended for treating acid gases, enters said furnace through the convective zone, flowing through said second series of pipes and leaves said furnace through the convective zone,
said second series of pipes is made of material resistant to acid gases.

This furnace can be introduced in refineries, gas fields, reforming plants or hydrogen generation plants, such as for example, by gasification and plants intended for the petrochemical industry.

DETAILED DESCRIPTION

The second series of pipes through which the second gas flow passes in the furnace of the invention is intended for acid gases, therefore it must be made of material resistant to acid gases. Materials resistant to acid gases means all materials usually used and known to the person expert in the art for such purposes.

According to a preferred embodiment of the furnace according to the present invention the second series of pipes contains a catalyst.

According to another preferred embodiment the first series of pipes contains a catalyst.

According to a further preferred embodiment of the furnace according to the present invention, both the first and the second series contain a catalyst.

The furnace according to the present invention is preferably devoted to syngas production by a steam reforming process, which occurs according to the following reaction scheme:

$$CH_4 + H_2O = CO + 3H_2. \qquad R1$$

Figure 3:
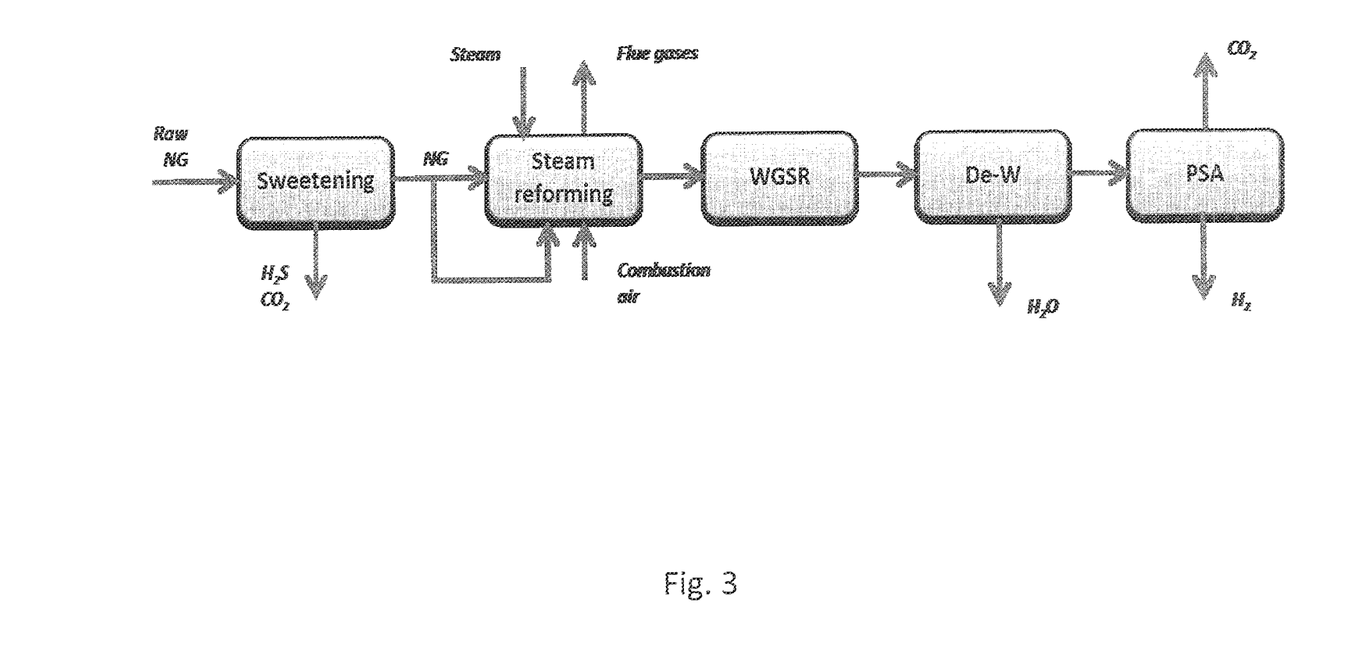
FIG. 3: a representation in form of block diagram of a steam reforming conventional process.

In the block diagram of FIG. 3 various steps of this process and the related operative units are reported. In particular, the conventional furnace or steam methane reformer, where the reaction R1 is carried out is indicated by the acronym SMR (Steam Methane Reformer).

In this FIG. 3, upstream of the furnace SMR, raw natural gas is conveyed in a sweetening unit, hereinafter indicated as SWEETENING unit, thereby acid gases $H_2S$ and $CO_2$ are separated. Preferably, amine sweetening techniques are used with mixtures of amine/water wherein amines are preferably MEA (methylamine), DEA (diethylamine), MDEA (methyl diethanolamine) or other similarly efficient technologies of (for example Sorption Enhanced, Water-Gas Shift or other hot-separations).

The gas thus purified is conveyed to the SMR unit where the reaction R1 takes place.

In this furnace, steam, preferably exceeding with respect to the stoichiometric ratio, is sent to allow the reaction R1. Gases leaving the SMR, comprising CO, $H_2$, H2O and non-reacted $CH_4$ are sent to a Water-Gas Shift Reactor or unit, hereinafter WGSR, where the shift reaction R2 is carried out: $CO + H_2O = CO_2 + H_2$.

Usually, such reaction R2 is employed in order to adjust the molar ratio between $H_2/CO$, to optimize morphology and efficiency of the following chemical synthesis (for example, base organic or fertilizer industry) or to maximize hydrogen production (for example, refineries or gasification). The reaction direction, as known depends on the operative temperature of the WGSR.

When leaving the WGSR, the process flow is treated in a unit for removing steam or in a de-hydration unit, hereinafter De-W (De-watering). In particular, such unit for removing steam consists in an apparatus wherein water contained inside the process flow treated therein is removed, by condensation.

Subsequently, the process flow leaving De-W is sent to a Pressure Swing unit, hereinafter PSA. In particular, PSA means a unit able to separate at least $H_2$ and $CO_2$ in order to maximize $H_2$ production to be used in following steps. The separated hydrogen is for example sent to a Hydro-DeSolforation unit, hereafter HDS for example a catalyst train of the Claus type, for removing sulphur from oil loads before processing thereof.

The furnace according to the present invention, where the reaction R1 takes place, comprises an upper convective zone, where the thermal exchange takes place by convection. The lower part, defined as radiant zone, comprises a firebox with one or more vertical and/or horizontal burners, configured to irradiate the series of pipes containing a catalyst typically used to carry out the reaction R1. The convective zone, through which the process fluid passes entering the conventional furnace, is heated by convection by off-gases produced in the radiant zone for the combustion of combustible gases in presence of oxygen. Thereby, the entering gas process flow undergoes a pre-heating step.

As reported above, the furnace differs from the conventional furnace in that it comprises a first and a second series of pipes. In the first series, the reaction R1 is carried out, while in the second series, only $H_2S$ gases are conveyed. In particular, the furnace according to the present invention may be designed according to more variants, among which the first one is certainly the preferred one.

Figure 1:
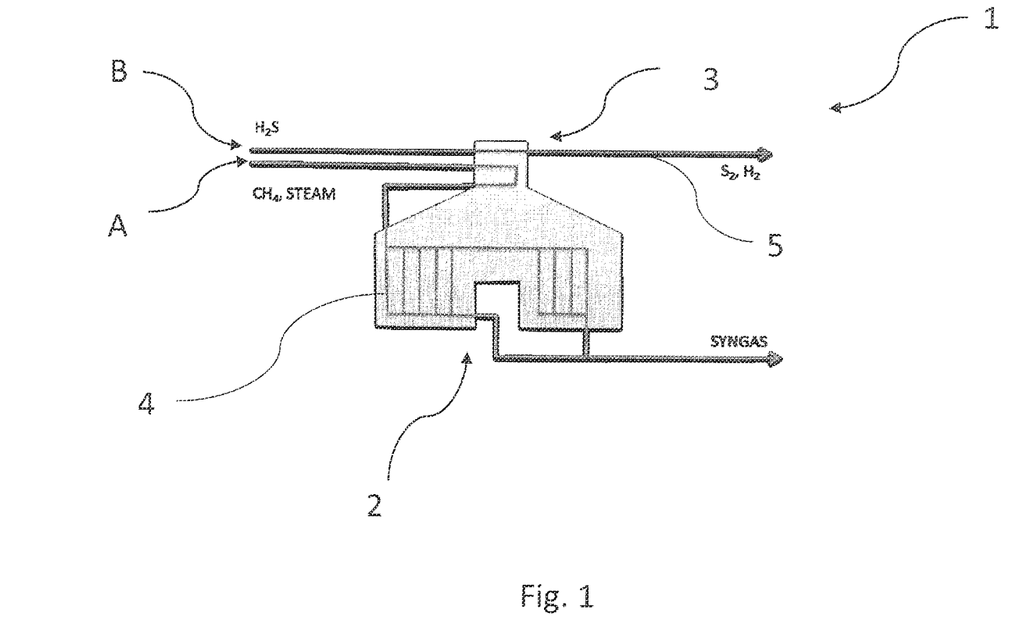
FIG. 1: a schematic representation of a furnace according to an embodiment of the present invention.

First Variant: Convective-Convective (FIG. 1)

In the first variant the first process flow A. entering the furnace 1, comprising a mixture of natural gas, preferably methane and steam, is treated in the same way as in an above-described conventional SMR-type furnace. In other words, methane and steam, the latter preferably exceeding with respect to the stoichiometric ratio, firstly pass through the convective zone 3, then through the radiant zone 2. While passing through the radiant zone 2 the first process flow is subdivided in the first series of pipes 4 where the reaction R1 takes place. The first process flow leaving the furnace 1 from the side of the radiant zone 2 comprises a mixture of CO and $H_2$ and optionally methane and non-reacted steam. The reaction R1 is carried out at a temperature between 550° C. and 1050° C., preferably between 750° C. and 900° C., more preferably the reaction R1 is carried out at a temperature of 800° C. For the purposes of the present invention the pressure of the first process flow inside the furnace is at least comprised between 1 bar and 50 bars, preferably between 10 bars and 40 bars and more preferably the pressure of the first process flow is of 20 bars.

The second process flow consists of a mixture of acid gases comprising $H_2S$. Thereby acid gases can be treated increasing the production of hydrogen for following treatments such as for example HDS and for reducing inlets of $CO_2$ and of other waste products.

The second process flow entering the furnace 1 according to the first variant passing through the convective zone 3 leaves the furnace 1. In other words, the second process flow is subdivided in the second series of pipes 5 at the convective zone 3 and leaves the furnace 1 once passed through such convective zone 3. It must be noted that the second series of pipes 5 is provided with a catalyst able to optimise one or more reactions. According to the present invention the catalyst is selected from gamma alumina, nickel, cobalt, molybdenum, iron, copper and other known elements in catalysis in their optionally supported forms.

Figure 2:
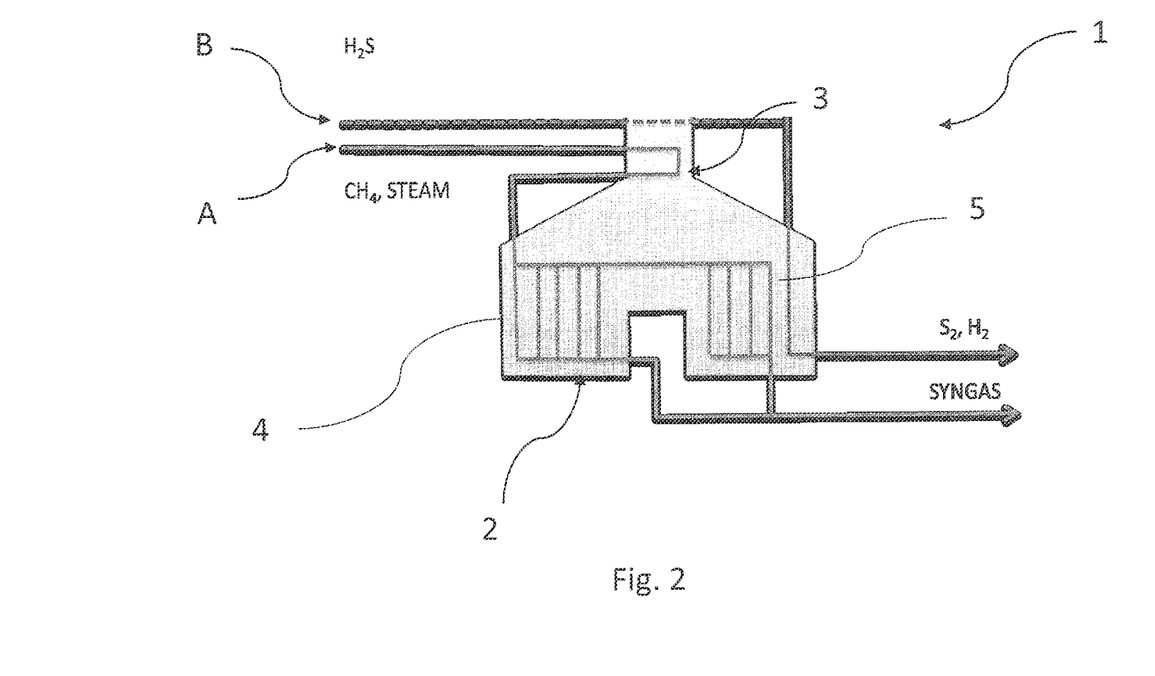
FIG. 2: a schematic representation of a furnace according to an alternative embodiment of the present invention.

Second Variant: Convective-Radiant (FIG. 2)

In the second variant the first process flow A. entering the furnace 1, comprising a mixture of natural gas, preferably methane and steam, is treated in the same way as in a conventional SMR-type furnace.

In the second variant the second process flow B., comprising $H_2S$, enters the furnace 1 for the convective zone 3 and leaves the furnace 1 passing through the radiant zone 2. In particular, the second process flow B. is subdivided in the second series of pipes 5 and passes firstly through the convective zone 3 and later through the radiant zone 2.

Third Variant Radiant-Radiant (Not Shown)

In the third variant the first process flow of process A. entering the furnace 1 comprising a mixture of natural gas, preferably methane, and steam is sent directly to the radiant zone 2 and passing through the series of pipes 4 it leaves the radiant zone. Furthermore, the second process fluid B. entering the furnace comprising H2S is directly sent to the radiant zone 2 passing through the second series of pipes 5.

The choice among the variants may be determined by the conditions envisaged during the step of designing the construction of a new plant or in redesigning the furnace 1 in revamping cases when a conventional SMR furnace is to be converted into a furnace according to the present invention.

Figure 4:
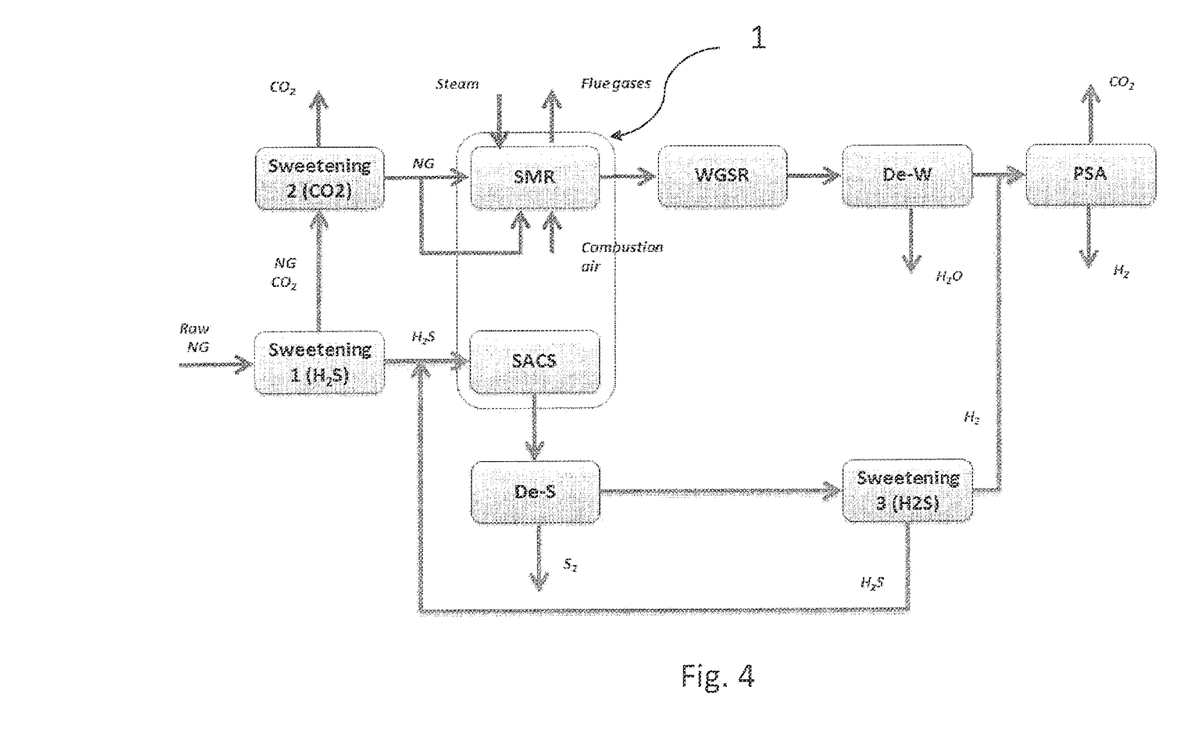
FIG. 4: a representation in form of block diagram wherein the furnace according to the embodiments of FIG. 1 is inserted in a steam reforming process.
Figure 5:
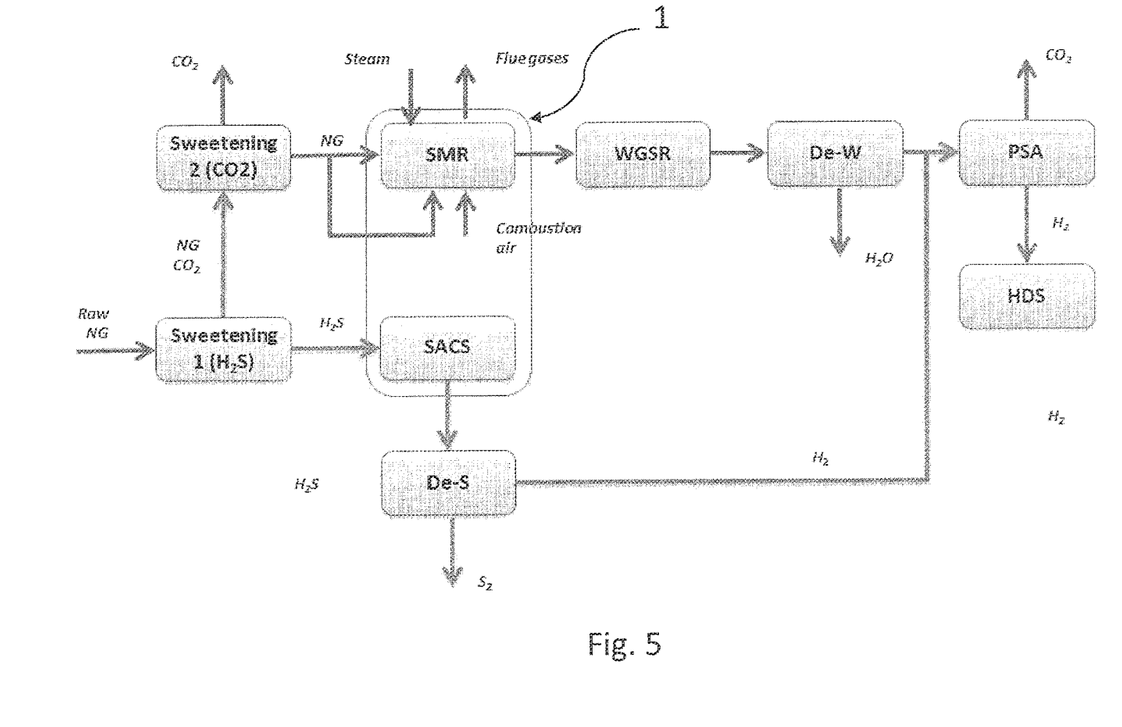
FIG. 5: a representation in form of block diagram wherein the furnace according to the embodiments of FIG. 1 is inserted in a steam reforming process.
Figure 6:
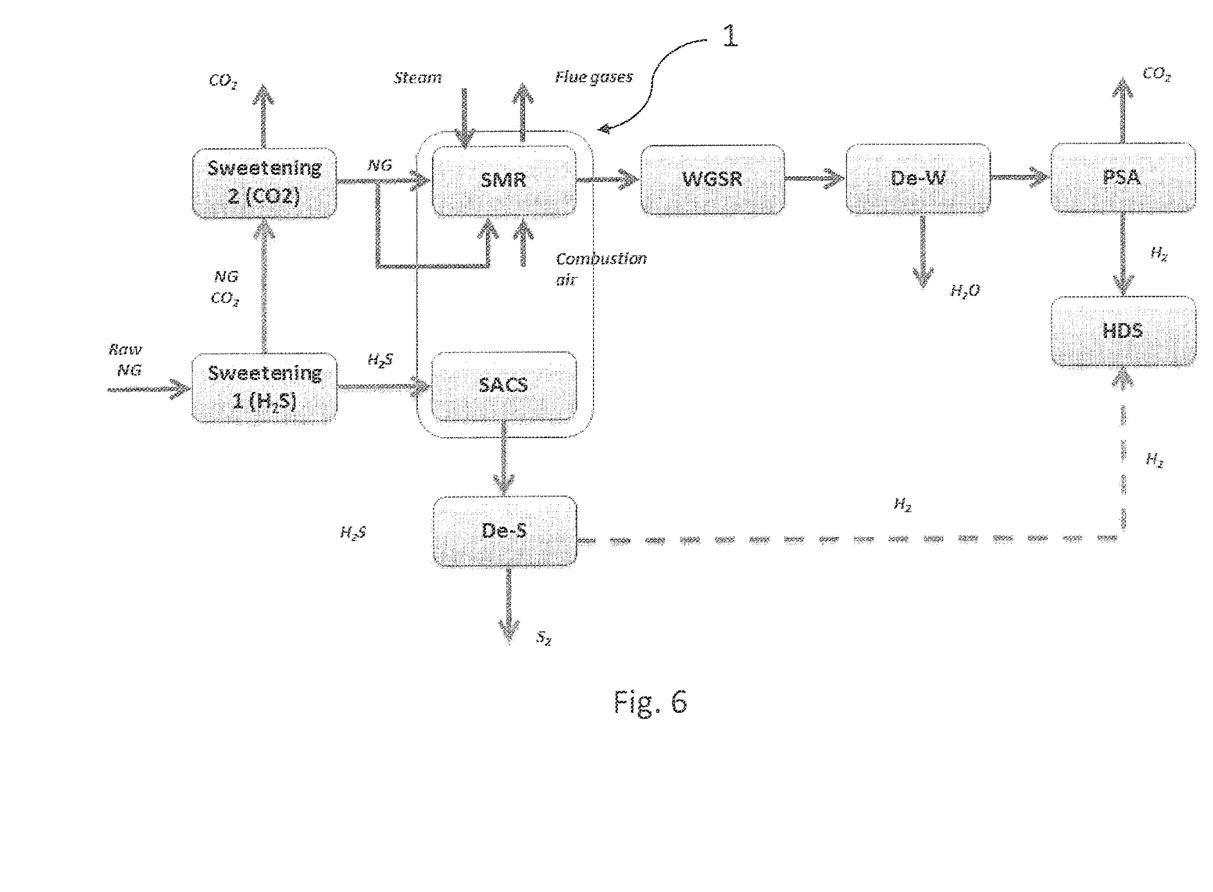
FIG. 6: a representation in form of block diagram wherein the furnace according to the embodiments of FIG. 1 is inserted in a steam reforming process.

In FIGS. 4-6 preferred embodiments of a plant wherein the furnace 1 is inserted are described. In particular, the second entering process flow comprises a mixture of $H_2S$. In detail, the second entering process flow is conveyed in the second series of pipes 5 where the splitting reaction R3 is carried out:

$$H_2S = H_2 + 0.5 S_2 \qquad R3$$

For the purposes of the present invention the part of the furnace where the reaction R1 takes place is identified as SMR, while the part of the furnace wherein the reaction R3 takes place is called Sulphidric Acid Cathalytic Splitting, hereinafter SACS as indicated in the figures.

Therefore, the furnace 1, comprises an SMR section and a section where the aforesaid reaction identified hereinafter by the acronym SACS takes place.

The R3 reaction preferably takes place in the convective zone 3 of the controlled temperature furnace 1 and it is ensured by the catalyst present in the second series of pipes 5.

Advantageously, the R3 reaction eases the substantially complete conversion (about 97%) of $H_2S$ into hydrogen and elemental sulphur.

In detail, the R3 reaction is carried out in a range of temperatures between 300° C. and 1050° C., preferably between 400° C. and 900° C., more preferably between 500° C. and 750°, most preferably the R3 reaction is carried out at temperatures comprised between 600 and 650° C.

The pressure of the second process flow inside the furnace is at least comprised in a range between 0.01 bar and 50 bars, preferably between 0.5 bar and 25 bar, more preferably between 1 bar and 5 bars.

According to the present invention the residence times of the second process flow inside SACS are comprised at least between 0.01 and 5 seconds, preferably between 0.1 and 2 seconds.

In this case, the second process flow leaving said second series of pipes, SACS, comprising a mixture of non-reacted $H_2$, $S_2$, $H_2S$, is sent to De-S wherein $S_2$ is partially separated by condensation from the mixture.

It is possible to arrange the energy recovery inside the convective section to promote temperatures adapted to the catalytic conversion R3, for example leaving the conversion pipes of the SACS below a pre-established temperature of the recovery exchangers, so as to have the highest thermal supply to dedicate to conversion.

In case of significant $H_2S$ flow rates it is possible to envisage a completely separated unit consisting in turn of its own firebox.

Advantageously, as other reaction products and/or by-products are absent, the selectivity of the whole process is equal to 100% of hydrogen and yield is similarly complete thanks to recycles described hereinafter.

The process flow leaving the De-S unit comprising a $H_2S$ mixture and small percentages of $H_2S$ is treated according to one of the following implementation modes:

first implementation mode, the mixture is sent to a SWEETENING-3 unit wherein $H_2S$ is separated from $H_2$. Subsequently, $H_2S$ is recycled and conveyed into the second process flow entering said furnace where the reaction R3 takes place. While hydrogen leaving the SWEETENING-3 unit is conveyed with the process flow leaving the dehydration unit De-W upstream of the pressure swing adsorption PSA where $H_2$ is separated from $CO_2$;

second implementation mode, the mixture is sent to the pressure swing adsorption PSA unit;

third implementation mode, the mixture is sent to a de-hydrosulphurization unit HDS.

Preferably, the process flow exiting the De-S comprising $S_2$, $H_2$ and non-reacted $H_2S$, is submitted in a reactor to the hydrogenation reaction R4 of residual sulphur vapours:

$$H_2 + 0.5 S_2 = H_2S. \qquad R4$$

The mixture leaving the reactor wherein hydrogenation of sulphur vapours comprising $H_2$ and $H_2S$ takes place is later treated according to different above listed implementation modes.

Advantageously, SMR+SACS allows to activate recirculation of hydrogen inside the plant. Such recirculation reduces in turn the methane load at the entrance of the SACS unit with a series of secondary advantageous effects:

Reduction of the steam to be supplied to the unit;

Reduction of the amount of methane to be supplied to firebox;

Reduction of the stoichiometric combustion at the firebox;

In addition to the already mentioned reduction of entering methane, such effects contribute to reduce the off-gas flow rate leaving the SACS head and the $CO_2$ flow rate released by the PSA unit. The reduction of further emissions adds to these due to the lack of H2S combustion in the traditional sulphur Recovery Units (SRUs), such as for example, Claus processes.

It must be noted that in the different embodiments in FIGS. 4-6, possibly the first and certainly the second process flow entering said furnace come from at least a sweetening unit which receives raw natural gas, comprising a mixture of methane, $CO_2$ and $H_2S$.

Specifically, the gas mixture of the first process flow, containing methane with added steam, for carrying out the reforming reaction, is treated with a SWEETENING unit configured to separate $H_2S$, $CO_2$ from methane.

Preferably, the raw natural gas is treated by a first SWEETENING-1 unit configured to separate $H_2S$ from the mixture containing natural gas and $CO_2$. Thereby, $H_2S$ is sent as a second process flow to the SACS unit, while the mixture containing natural gas and $CO_2$ is sent to a second SWEETENING-2 unit configured to separate $CO_2$ from natural gas. Thereby, the separated natural gas is sent to the SMR unit as first process flow while the separated $CO_2$ is recycled or treated.

Comparison Example Between Conventional SMR Process (FIG. 3) and SMR+SACS Process According to the Present Invention (FIG. 4)

The simulation of the SMR+SACS apparatus was carried out by means of DSmoke, a computing software for analysing and verifying conversion thermal systems (pyrolysis and combustion) developed at the Centre for Sustainable Process Engineering (SuPER) of the Polytechnic University of Milan. Dsmoke is a software based on a kinetic (30k reactions) and thermodynamic (NIST) database validated by experimental data and industrially present in more than 40 applications. Dsmoke results were integrated in the simulation suite PRO/II (by Schneider-Electric).

SMR Base Case

Figure 7:
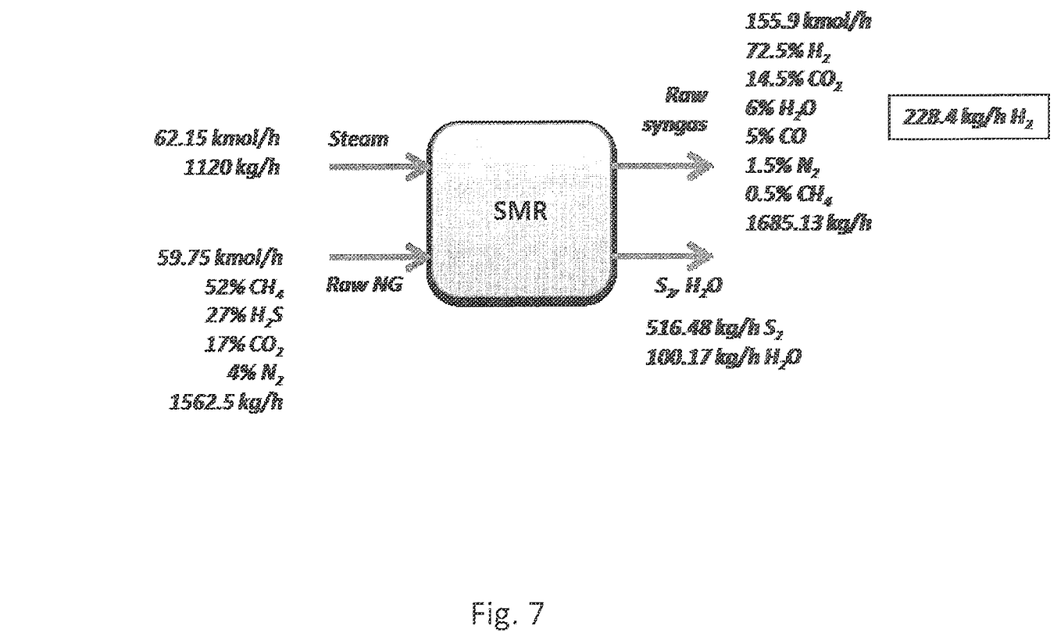
FIG. 7: a representation in form of block diagram of the flows entering and leaving a conventional furnace used in the conventional steam reforming 1 process of FIG. 3, FIG. 8: a representation in form of block diagram of the comparison between the conventional furnace used in the conventional steam reforming process of FIG. 3 with the process according to the present invention of FIG. 4.

The selected base case for assessing and comparing performances of a SMR with the new SACS apparatus (dealt with in the following example) is reported in Table 1. For the base case, the process diagram of FIG. 3 is considered, an SMR conventional furnace wherein the second series of pipes is absent thus without SACS, and the relevant results obtained with the Commercial Suite PRO/II® (by Schneider-Electric) are summarized in FIG. 7. In particular, it can be noted that hydrogen production through SMR is equal to 228.4 kg/h.

TABLE 1

Flow rate and composition coming from a gas field (Caspian Sea).

|  | Molar Composition | Molar flow [kmol/h] | Mass Flow [kg/h] | Mass Flow [ton/day] |
| --- | --- | --- | --- | --- |
| N2 | 2.00% | 31.250 | 875.000 | 21.000 |
| CO2 | 15.00% | 234.375 | 10312.500 | 247.500 |
| H2S | 25.00% | 390.625 | 13281.250 | 318.750 |
| CH4 | 50.00% | 781.250 | 12500.000 | 300.000 |
| C2H6 | 2.00% | 31.250 | 937.500 | 22.500 |
| C3H8 | 1.00% | 15.625 | 687.500 | 16.500 |
| C4H10 | 1.00% | 15.625 | 906.250 | 21.750 |
| C5H12 | 1.00% | 15.625 | 1125.000 | 27.000 |
| C6H14 | 3.00% | 46.875 | 4031.250 | 96.750 |
| TOT | 100.00% | 1562.500 | 44656.250 | 1071.750 |

The process scheme for SACS+SMR in a gas field is represented in FIG. 4. The invention, SACS, does not only receive the natural gas (NG) coming from the sweetening, but, unlike the conventional SMR, also receives $H_2S$ streams in the area of catalytic pipes positioned convectively and intended for the R3 conversion. The effluents leaving the SACS are sent to known systems for separating sulphur, and, upon separation of non-reacted products and recirculation thereof upstream of the SACS, the obtained hydrogen is sent downstream of the WGSR section, entering PSA or directly HDS as hydrogen surplus.

The hydrogen obtained thus represents a flow rate contribution resulting from the conventional reforming transformation R1 and an additional portion deriving from R3 reaction. If needed, the hydrogen produced by R3 can contribute to adjust the $H_2/CO$ of the syngas obtained by the R1 reaction, for example in the case of chemical synthesis.

Figure 8:
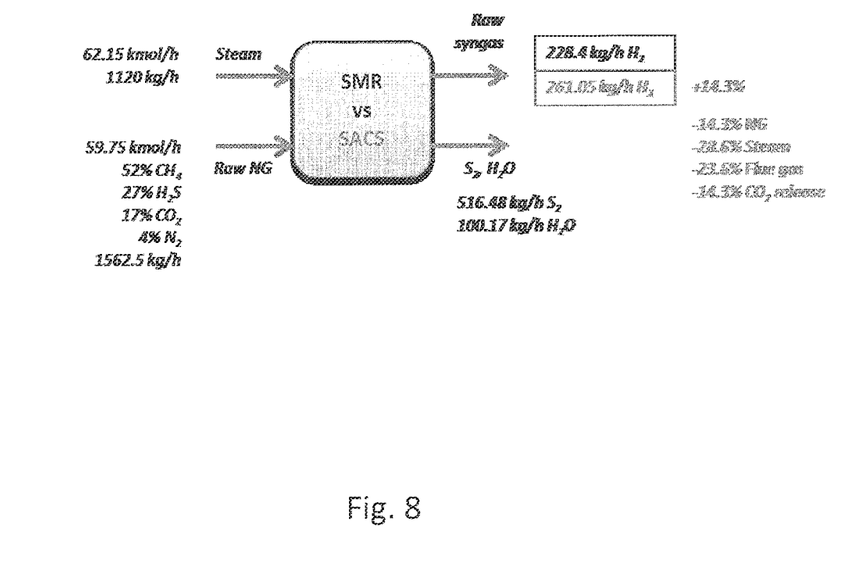

The advantages obtained with the Commercial Suite PRO/II® (by Schneider-Electric) are summarized in FIG. 8. The analysis is carried out with SACS at 600° C. and 1.8 bar, with a once-through conversion for each single pipe equal to 97% and subsequent recycling of non-reacted products. As a whole, it derives that, being conditions and supply equal to the conventional SMR, the invention SACS+SMR allows to:

5. Increase hydrogen production from 228.4 kg/h to 261.05 kg/h (+14.3%)
6. Reduce the steam request for the steam reforming unit (−28.6%)
7. Reduce off-gases released in the atmosphere with respect to the SMR (−23.6%)
8. Reduce $CO_2$ emissions from the PSA unit (−14.3%)

As the once-through conversion is higher than 96%, also other implementation modes can be conceived for the invention SACS (FIGS. 5 and 6). It is in fact possible to remove the separation unit Sweetening-3 and send the current directly to PSA, upon removal of the elemental sulphur. In this case, PSA will itself remove the residual portion of $H_2S$.

As a further alternative, by removing the Sweetening-3 process, it is possible to send the hydrogen current with residual H2S directly to the HDS. Such solution is preferable as the hydrogen potential of the $H_2S$ is totally recovered thanks to the process recycles already existing in refineries/gas fields.

The invention claimed is:

1. A furnace for gas fields, refineries reforming, petrochemical plants, or hydrogen generation by gasification, the furnace comprising:
   a radiant zone;
   a convective zone; and
   a first series of pipes and at least a second series of pipes through which at least two segregated process gas flows respectively pass;
   wherein a first process gas flow of the at least two segregated process gas flows enters the furnace through the convective zone and, flowing through the first series of pipes, leaves the furnace through the radiant zone, or alternatively the first process gas flow enters the furnace through the radiant zone and, flowing through the first series of pipes, leaves the furnace through the radiant zone,
   wherein at least a second process gas flow of the at least two segregated process gas flows enters the furnace through the convective zone, passing through the second series of pipes, and leaves the furnace through the convective zone, and
   wherein the second of series of pipes:
   is made of material resistant to acid gases; and
   contains a catalyst.

2. A process for producing syngas by steam reforming from methane carried out in the furnace of claim 1, the process comprising:
   the first process gas flow comprising a mixture of the methane and steam enters the furnace and passes in the first series of pipes, wherein at the radiant zone, the syngas is produced according to a steam-reforming reaction R1:

$$CH_4 + H_2O = CO + 3H_2 \qquad \text{R1}$$

wherein the first series of pipes at least in the radiant zone comprises a tube bundle containing a catalyst suitable for carrying out the steam-reforming reaction R1;

the second process gas flow consisting of acid gases comprising $H_2S$ flows in the second series of pipes wherein at the convective zone, the reaction R3 takes place:

$$H_2S = H_2 + 0.5 S_2 \quad \text{R3}$$

and wherein the catalyst contained in the second series of pipes is selected among gamma alumina, and nickel, cobalt, molybdenum, iron, optionally supported.

3. The process of claim 2, wherein the reaction R3 takes place at temperature greater than or equal to 300° C. and less than or equal to 1,050° C.

4. The process of claim 3, wherein a pressure of the second process gas flow inside the furnace is greater than or equal to 0.01 bar and less than or equal to 50 bar.

5. The process of claim 4, further comprising:
the second process gas flow leaving the second series of pipes comprising a mixture of $H_2$, $S_2$, and unreacted $H_2S$ is sent to a desulfurization unit, where $S_2$ is partially separated from the mixture by condensation.

6. The process of claim 5, further comprising:
the first process gas flow leaving the furnace is sent to a water gas shift reactor where a shift reaction R2 takes place:

$$CO + H_2O = CO_2 + H_2 \quad \text{R2}$$

the process gas flow leaving the water gas shift reactor is sent to a dehydration unit; and
the process gas flow leaving the dehydration unit is sent to a pressure swing adsorption unit where $CO_2$ and $H_2$ are separated.

7. The process of claim 6, further comprising:
the mixture leaving the desulfurization unit comprising $H_2S$ and $H_2$ is sent to a sweetening unit where $H_2S$ is separated from $H_2$; and
the $H_2$ coming from the sweetening unit is conveyed with the process gas flow leaving the dehydration unit upstream the optional pressure swing adsorption unit where the $CO_2$ and $H_2$ are separated.

8. The process of claim 6, wherein the mixture leaving the desulfurization unit comprising $H_2S$ and $H_2$ is sent to the pressure swing adsorption unit.

9. The process of claim 6, wherein the mixture leaving the desulfurization unit comprising $H_2S$ and $H_2$ is sent directly to a dehydrosulfurization unit.

10. The process of claim 9, wherein the first process gas flow and the second process gas flow entering the furnace come from at least one sweetening unit that receives incoming raw natural gas comprising a mixture of methane, $CO_2$, and $H_2S$.

11. The process of claim 2, wherein the reaction R3 takes place at temperature greater than or equal to 400° C. and less than or equal to 900° C.

12. The process of claim 2, wherein the reaction R3 takes place at temperature greater than or equal to 500° C. and less than or equal to 750° C.

13. The process of claim 2, wherein the reaction R3 takes place at temperature greater than or equal to 600° C. and less than or equal to 650° C.

14. The process of claim 3, wherein a pressure of the second process gas flow inside the furnace is greater than or equal to 0.5 bar and less than or equal to 25 bar.

15. The process of claim 3, wherein a pressure of the second process gas flow inside the furnace is greater than or equal to 1 bar and less than or equal to 5 bar.

16. The process of claim 2, wherein a pressure of the second process gas flow inside the furnace is greater than or equal to 0.01 bar and less than or equal to 50 bar.

17. The process of claim 2, wherein a pressure of the second process gas flow inside the furnace is greater than or equal to 0.5 bar and less than or equal to 25 bar.

18. The process of claim 2, wherein a pressure of the second process gas flow inside the furnace is greater than or equal to 1 bar and less than or equal to 5 bar.

19. The process of claim 6, wherein the first process gas flow and the second process gas flow entering the furnace come from at least one sweetening unit that receives incoming raw natural gas comprising a mixture of methane, $CO_2$, and $H_2S$.

* * * * *